Patented May 26, 1931

1,807,078

UNITED STATES PATENT OFFICE

HAROLD W. WALKER, OF EDGEWOOD, MARYLAND, AND HOWARD S. McQUAID, OF LAKEWOOD, OHIO

INSECTICIDE

No Drawing.   Application filed May 10, 1926.  Serial No. 108,110.

This invention relates to insecticides; and it comprises as a new insecticide particularly adapted for the cotton boll weevil, but also useful against other insects, a mass of extremely fine coal or the like carrying adsorbed on its surfaces a minute amount of freely soluble poisonous material, this material being usually, but not invariably, arsenious oxid, $As_2O_3$, in amount between 5.0 and 0.1 per cent of the coal; all as more fully hereinafter set forth and as claimed.

An ordinary type of insecticide used by dusting or strewing on plant foliage is some type of insoluble poisonous material; that is, insoluble in dew and rain. Very many materials are used for this purpose and among them various insoluble arsenites and arsenates; Paris green, arsenate of lead, arsenite and arsenate of lime, etc., etc. Arsenical materials are poisonous to plants and it is for this reason that materials insoluble in water are customarily used. Many State laws prohibit the sale of insecticides containing more than a minimal amount of 'soluble arsenic'— compounds of arsenic soluble in water; what amounts to more than a trace. It is considered that if there be present any substantial amount of soluble arsenic or other soluble active poison it will necessarily go into solution with drew and rain and will damage leaves. In using arsenicals and other very active poisons it is the custom to use an inert diluent or filler; this being partly for ease in distribution and partly because the amount of poison to be applied to any one plant is after all very little. It is more convenient for example in getting the right amount of poison to dilute arsenite of lime with plaster-of-Paris, talc, or something of that sort and then apply.

In the application of the right amount of poison to the leaves of a plant it is of course important that the poison stay in place and not dust off or be washed off by dew or rain. Therefore these powders sometimes contain a little adhesive material of one kind or another. In place on the plant leaf, sometimes the poison reaches the digestive apparatus of the insect directly; but generally it is indirectly; it smears over the insect and is finally ingested.

We have found that under certain conditions the prejudice against the presence of soluble poisons in dusting powders is erroneous; it is possible to use soluble materials without harm if certain precautions be taken. These precautions include the use of an adsorptive very fine powder on whose surfaces the soluble material may be adsorbed and thereby held against washing and solution. In so doing, since the soluble poisons are much more active than the insoluble, an extremely small amount of poison is all that is required; and this very small amount can be safely held by adsorption; doing no damage to the plant. We regard fine powdered coal or wood charcoal as the best carrier for the present purposes. When coal is used it may be either bituminous coal or anthracite. It is best reduced to such a fineness that all will pass through a 200-mesh sieve; which of course implies that much of it is finer than 300 mesh. While the adsorptive power of coal is not so great as that of some of the charcoals and decolorizing carbons it is amply sufficient for the present purposes. These charcoals and decolorizing carbons may be used but offer no substantial advantage over finely powdered ordinary coal and do not have certain of its advantages as hereinafter pointed out. Instead of coal, lignites, brown coals, etc. may be used. But on the whole ordinary coal such as is used for fuel we regard as the best carrier. There are also many other adsorptive mineral matters such as silica gel, etc. which can be used for our purposes we do not regard them as being so advantageous as carbonaceous carriers, and particularly coal. Coal of a fineness of 200-mesh and finer is an extremely "smeary" material; it adheres well to the leaf surface with good resistance against washing and at the same time does not close the pores which are necessary for the life of the leaf. It sticks, so to speak, without the necessity for any fluid or fluent adhesive. And it clings equally well to the insect's body so that it ultimately reaches its digestive organs.

Using powdered coal as an adsorptive body we find that as little $As_2O_3$ as 1.5 per cent is amply sufficient as a lethal agent against insects, and in particular the cotton boll weevil. Frequently as little as 0.5 per cent on the weight of the coal is sufficient. From coal carrying arsenious oxid in these proportions in an adsorbed condition water extracts practically no $As_2O_3$. The insecticide is therefore safe for use on plant leaves in spite of its great toxicity; firstly, because there is so little arsenic present, and secondly, because in any event what there is there is practically not extracted by water. Solutions of substantial strength cannot form. Coal containing as little as .01 per cent of $As_2O_3$ has a toxic effect on boll weevils.

Certain curious relations have been found by trial in the practice of the present invention. While dust $As_2O_3$ is less toxic to weevils and the like than, $As_2O_5$ in a similar state of comminution, yet $As_2O_3$ on coal dust is more toxic to insects than the corresponding amount of $As_2O_5$ similarly supported. The filmwise distribution of the poison on the surface of the coal particles is equivalent to an extremely high comminution; and it may be that this fact is responsible for the noted observation; it increases availability in the insect's digestive apparatus.

In making the new insecticide coal is pulverized in any ordinary or convenient manner until its fineness is sufficient to insure all passing through a 200-mesh sieve. It may be even finer. It may be wet ground to reduce danger of fire or explosion. Dry ground coal may be wet with water in any convenient way to make a moist, easily handled mass prior to incorporation of the arsenic or other insecticide. Using dry coal and dry $As_2O_3$ surface distribution of the arsenic may be effected by simply heating the two together at a moderate temperature, $As_2O_3$ subliming on and being adsorbed on the surface of the coal. However it is commonly more convenient to treat the coal with a solution of $As_2O_3$ in water, the solution being of sufficient strength to give the desired percentage on the material. Usually we employ about 1.25 parts by weight of commercial white arsenic for every 100 parts by weight of fine dry coal. The total amount of water used in incorporation may be half the weight of the coal. Instead of white arsenic, $As_2O_3$, we may use a solution of $As_2O_5$, arsenic acid. But arsenic acid not being as toxic to insects in this relation a greater percentage is required; usually between 2 and 5 per cent of the coal. As high as 2 per cent of $As_2O_5$ can be used without injury to the plant in some cases. Plants vary in their sensitivity to the different arsenicals. However we regard $As_2O_3$ as not only more economical but better. In lieu of using $As_2O_3$ as such we can employ it in the form of a soluble arsenite such as sodium arsenite.

The extreme fineness to which we reduce the coal is greater than is necessary for ingestion by the weevil which can and does take particles 20 times as large, but is highly advantageous in giving smooth even distribution and smear-adhesion both to the leaf and to the weevil. Also by fine comminution we get more advantageous results from the adsorptive power of the carbon.

In lieu of arsenicals we may use other soluble insecticidal bodies such as sodium fluorid. With sodium fluorid the amount to be used ranges between 1 and 4 per cent by weight. This amount is necessary for lethal action on the weevil but is not great enough, because of the adsorption, to harm the leaf.

As stated, plants vary in their sensitivity to arsenicals and the same is true of insects. In some cases, in dealing with resistant insects and susceptible plants, it is an advantage to further coat the described material with a little digestible grease or oil; enough to, so to speak, waterproof the powder without interfering with its free running qualities. This enables the use of more of the arsenical or the other poison than, sometimes, can be held by the adsorptive power of the coal alone. It also enables using coals of low adsorptive power. The presence of the oil coating often gives a little better adhesion to the leaf and to the body of the insect. Any of the common digestible oleaginous materials such as tallow, lard, olive oil, cottonseed oil, etc. may be employed; the compound insecticide made as hereinbefore being lightly greased with the oil in any convenient manner. Because of the enormous surface offered by the fine coal sometimes as much as 40 per cent oil on the coal is required. Sometimes, less is used, and sometimes somewhat more. Other waterproofing oils which are not digestible, such as oil of wintergreen, lanolin, pine oil, nitrobenzene, paradichlorbenzene, etc. may be employed but they are not more advantageous than the digestible oils mentioned. The action of the oily coating is of course, like that of the adsorptive power of the coal, to protect a soluble poison against the action of dew and rain, thereby protecting the plant. In the insect the digestible oil or grease does not interfere with the action of the poison.

It is possible to combine the poison with the oil, coating the coal dust with an oil solution of various organic arsenicals. In this case the oil solution is itself adsorbed together with the contained arsenical. Among the organic arsenicals which may be used in this manner we may mention diphenylaminechlorarsine, diphenylaminearsenious oxid, diphenylchlorarsine, diphenylarsenious oxid, phenyldichlorarsine, and phenylarsenious oxid. These various materials are sufficiently soluble in the common fatty oils and greases to render their use practicable. Such solutions may be directly added to the coal and agitated therewith until even distribution is effected. Often, about four per cent (on the coal) of such a solution is used. It is best to agitate the charged oil with the coal dust at a temperature sufficient to make the oil freely liquid. As before, not more oil is used than is consistent with the powder being free running. For distribution of an insecticide as dust, a free running powder is necessary. Oil charged with dissolved arsenical bodies may be used in conjunction with mineral insecticides adsorbed by the coal. For example, coal may be charged with a small amount of soluble arsenical in the way described and then waterproofed by a little oil carrying one of the stated organic arsenicals.

What we claim is:—

1. As a new insecticide, a very fine powdered material of adsorptive nature containing a small amount of an adsorbed soluble compound of arsenic compound; the proportion of such adsorbed arsenic being insufficient to give solutions of any substantial strength on contact with water.

2. As a new insecticide, a body of very fine powdered coal carrying an adsorbed soluble poison in small amount; the amount of such adsorbed soluble poison being insufficient to afford solutions of any substantial strength on contact with water.

3. As a new insecticide, a body of very fine powdered coal carrying an adsorbed soluble arsenic compound in small amount; the amount of such adsorbed arsenic compound being insufficient to afford solutions of any substantial strength on contact with water.

4. As a new insecticide, coal powdered to a fineness at least as great as 200-mesh and carrying $As_2O_3$ in an adsorbed condition the proportion of such adsorbed $As_2O_3$ being between 5.0 and 0.1 per cent of the coal.

5. As a new insecticide, fine powdered coal carrying an adsorbed insecticide and also carrying a waterproofing oil, the amount of such oil being not greater than is consistent with free-running properties in the preparation.

6. A free-running insecticidal preparation comprising fine coal dust carrying adsorbed poisonous material and a little greasy material containing dissolved arsenicals, the amount of such greasy material being insufficient to cause the grains to adhere.

In testimony whereof, we have hereunto affixed our signatures at the places and on the dates indicated.

Signed at Edgewood, in the county of Harford and State of Maryland, this 4th day of May, 1926.

HAROLD W. WALKER.

Signed at Cleveland, in the county of Cuyahoga and State of Ohio, this 8th day of May, 1926.

HOWARD S. McQUAID.